(12) United States Patent
Osajima (10) Patent No.: US 9,323,491 B2
(45) Date of Patent: Apr. 26, 2016

(54) IMAGE PROCESSING APPARATUS, IMAGE PROCESSING SYSTEM, AND COMPUTER-READABLE MEDIUM

(71) Applicant: FUJI XEROX Co., Ltd., Minato-ku, Tokyo (JP)

(72) Inventor: Kentaro Osajima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/450,698

(22) Filed: Aug. 4, 2014

(65) Prior Publication Data
US 2015/0146244 A1 May 28, 2015

(30) Foreign Application Priority Data
Nov. 28, 2013 (JP) ................................ 2013-246684

(51) Int. Cl.
*G06K 15/00* (2006.01)
*G06F 3/12* (2006.01)
(52) U.S. Cl.
CPC .............. *G06F 3/1261* (2013.01); *G06F 3/121* (2013.01); *G06F 3/1218* (2013.01); *G06F 3/1264* (2013.01); *G06F 3/1241* (2013.01); *G06F 3/1255* (2013.01)
(58) Field of Classification Search
USPC ................. 358/1.15, 448, 468, 1.18, 400, 500
See application file for complete search history.

(56) References Cited

U.S. PATENT DOCUMENTS

| 2009/0174898 A1* | 7/2009 | Ono .............................. 358/1.15 |
| 2012/0120448 A1* | 5/2012 | Komaba et al. .............. 358/1.15 |
| 2013/0214472 A1* | 8/2013 | Suzuki ......................... 270/1.01 |
| 2013/0251273 A1* | 9/2013 | Westphal ...................... 382/218 |

FOREIGN PATENT DOCUMENTS

JP 2000-010753 A 1/2000

* cited by examiner

*Primary Examiner* — Jerome Grant, II
(74) *Attorney, Agent, or Firm* — Sughrue Mion, PLLC (57) ABSTRACT

An image processing apparatus includes a storage storing attribute information of the apparatus, a receiving unit receiving an instruction to perform image processing from a terminal, a checking unit, a request unit, an acquiring unit, an extracting unit, and a notification unit. The checking unit checks the image processing condition against the attribute information, and determines whether the instruction is executable in the apparatus. The request unit requests attribute information from a second image processing apparatus when the instruction is determined to be inexecutable in the apparatus. The acquiring unit acquires one or more pieces of attribute information transmitted as a response to the request. The extracting unit extracts attribute information of a second image processing apparatus which may execute the instruction, from the one or more pieces of attribute information. The notification unit notifies the terminal of identification information of the second apparatus storing the extracted attribute information.

14 Claims, 7 Drawing Sheets

FIG. 4

| INSTRUCTION NUMBER | CONDITIONS OF IMAGE FORMATION | | | | | IMAGE DATA |
|---|---|---|---|---|---|---|
| | BOOKBINDING | STAPLING | SADDLE STITCHING | COLOR PRINTING | THE NUMBER OF SHEETS | |
| 1301 | NECESSARY | UNNECESSARY | UNNECESSARY | NECESSARY | 145 | ... |
| 1302 | UNNECESSARY | NECESSARY | UNNECESSARY | UNNECESSARY | 32 | ... |
| 1303 | UNNECESSARY | UNNECESSARY | NECESSARY | NECESSARY | 1 | ... |
| ⋮ | ⋮ | ⋮ | ⋮ | ⋮ | ⋮ | ⋮ |

FIG. 5

| IDENTIFICATION INFORMATION | P01 |
|---|---|
| BOOKBINDING FUNCTION | PRESENCE |
| STAPLER | PRESENCE |
| SADDLE STITCHING FUNCTION | ABSENCE |
| COLOR PRINTING FUNCTION | ABSENCE |
| REMAINING QUANTITY OF MEDIUM | 100 |
| REMAINING QUANTITY OF INSTRUCTIONS | 4 |
| POSITION | (x1, y1, z1) |
| ⋮ | ⋮ |

FIG. 6

| IDENTIFICATION INFORMATION | CAPABILITIES OF IMAGE FORMING APPARATUS | | | | | REMAINING QUANTITY OF MEDIUM | REMAINING QUANTITY OF INSTRUCTIONS | DISTANCE [m] |
|---|---|---|---|---|---|---|---|---|
| | BOOKBINDING | STAPLING | SADDLE STITCHING | COLOR PRINTING | | | | |
| P02 | PRESENCE | ABSENCE | ABSENCE | PRESENCE | | 500 | 4 | 15 |
| P03 | ABSENCE | PRESENCE | ABSENCE | ABSENCE | | 400 | 2 | 8 |
| P04 | ABSENCE | ABSENCE | PRESENCE | PRESENCE | | 20 | 0 | 2500 |
| ... | ... | ... | ... | ... | | ... | ... | ... |

FIG. 7

| REQUESTER | P01 |
|---|---|
| INSTRUCTION NUMBER | 1301 |
| REQUEST RECEIVER | P02 |

IMAGE PROCESSING APPARATUS, IMAGE PROCESSING SYSTEM, AND COMPUTER-READABLE MEDIUM

CROSS-REFERENCE TO RELATED APPLICATIONS

This application is based on and claims priority under 35 USC 119 from Japanese Patent Application No. 2013-246684 filed Nov. 28, 2013.

BACKGROUND

Technical Field

The present invention relates to an image processing apparatus, an image processing system, and a computer-readable medium.

SUMMARY

According to an aspect of the invention, there is provided an image processing apparatus including a storage, a receiving unit, a checking unit, a request unit, an acquiring unit, an extracting unit, and a notification unit. The storage stores attribute information describing an attribute of the image processing apparatus. The receiving unit receives an instruction to perform image processing, from a terminal. The checking unit checks a condition of the image processing of the instruction received by the receiving unit against the attribute information stored in the storage, and determines whether or not the image processing apparatus is capable of executing the instruction. The request unit requests attribute information from a second image processing apparatus when the checking unit determines that the image processing apparatus is not capable of executing the instruction. The acquiring unit acquires one or more pieces of attribute information transmitted as a response to the request. The extracting unit extracts attribute information of a second image processing apparatus which is capable of executing the instruction, from the one or more pieces of attribute information acquired by the acquiring unit. The notification unit notifies the terminal of identification information of the second image processing apparatus storing the attribute information extracted by the extracting unit. The terminal has transmitted the instruction.

BRIEF DESCRIPTION OF THE DRAWINGS

Exemplary embodiments of the present invention will be described in detail based on the following figures, wherein.

DETAILED DESCRIPTION

1. Exemplary Embodiment
1-1. Configuration

Figure 1:
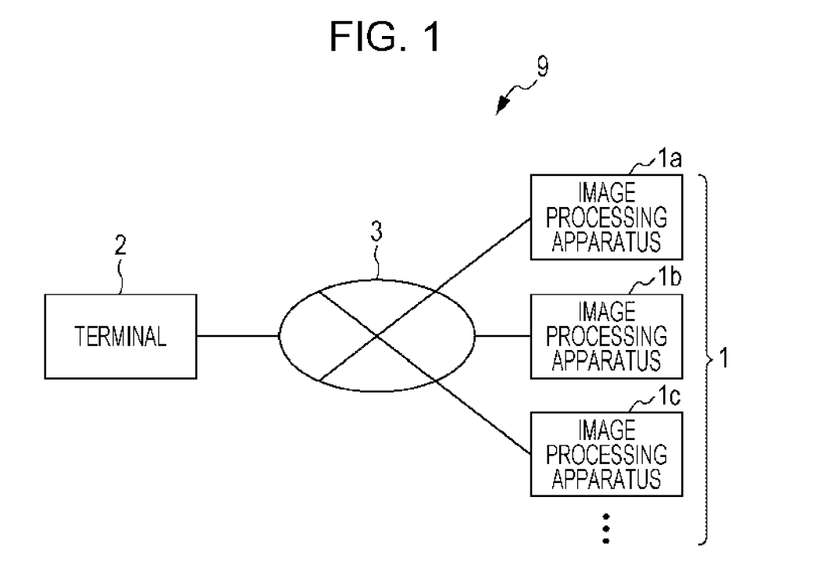
FIG. 1 is a diagram illustrating the configuration of an image processing system according to an exemplary embodiment of the present invention.

FIG. 1 is a diagram illustrating the configuration of an image processing system 9 according to an exemplary embodiment of the present invention. The image processing system 9 includes multiple image processing apparatuses 1a, 1b, 1c, etc. (hereinafter, collectively called an "image processing apparatus 1" when it is not necessary to differentiate one image processing apparatus from another particularly), a terminal 2, and a communication line 3. The image processing system 9 may include more than one terminal 2.

An image processing apparatus 1 is an apparatus which performs requested image processing, and has a function of searching for a second image processing apparatus 1 when the image processing apparatus 1 is not capable of performing the image processing, and notifying a user. The terminal 2 is an apparatus, using which a user instructs an image processing apparatus 1 to perform image processing, and is a personal computer or the like. The communication line 3 is a line for relaying communication between an image processing apparatus 1 and the terminal 2, and is, for example, the Internet.

Figure 2:
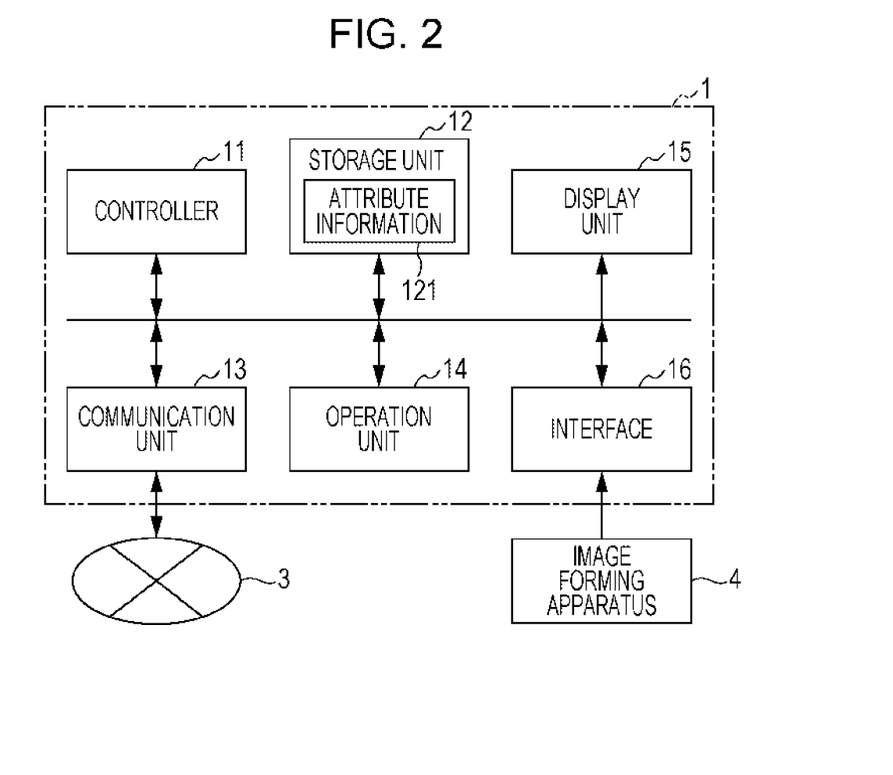
FIG. 2 is a diagram illustrating the configuration of an image processing apparatus according to the exemplary embodiment of the present invention.

FIG. 2 is a diagram illustrating the configuration of an image processing apparatus 1 according to the exemplary embodiment of the present invention. The image processing apparatus 1 includes a controller 11, a storage unit 12, a communication unit 13, an operation unit 14, a display unit 15, and an interface 16. The controller 11 is a unit for controlling operations of the units included in the image processing apparatus 1. The controller 11 includes an arithmetic processing unit such as a central processing unit (CPU) and storage devices, such as a read only memory (ROM) and a random access memory (RAM), and executes programs stored in these storage devices.

The communication unit 13 is an interface for communicating with the terminal 2 via the communication line 3, and is, for example, a type of modem or the like. The operation unit 14 includes a coordinates acquiring unit and operation buttons for supplying various types of instructions, and receives an operation performed by a user and supplies a signal according to the operation to the controller 11.

The interface 16 is connected to an image forming apparatus 4 which forms images, so as to transmit an instruction from the image processing apparatus 1 to the image forming apparatus 4.

The storage unit 12 is a large-capacity storage unit, such as a hard disk or a flush memory, and stores programs which are read by the controller 11. The storage unit 12 may include a so-called removable disk, that is, a removable recording medium.

The storage unit 12 stores attribute information 121 describing the attributes of the image processing apparatus 1, as well as the above-described programs. The attributes of the image processing apparatus 1 include identification information and position information of the image processing apparatus 1, and also includes capability information indicating whether or not the image processing apparatus 1 is capable of performing a received instruction.

The image processing apparatus 1 is connected to the image forming apparatus 4 via the interface 16. The image forming apparatus 4 is controlled by the image processing apparatus 1. Therefore, the attributes of the image processing apparatus 1 include capability information describing the capability of the image forming apparatus 4 connected via the interface 16 of the image processing apparatus 1. The storage unit 12 is an exemplary storage which stores attribute information describing the attributes of the image processing apparatus 1.

Figure 3:
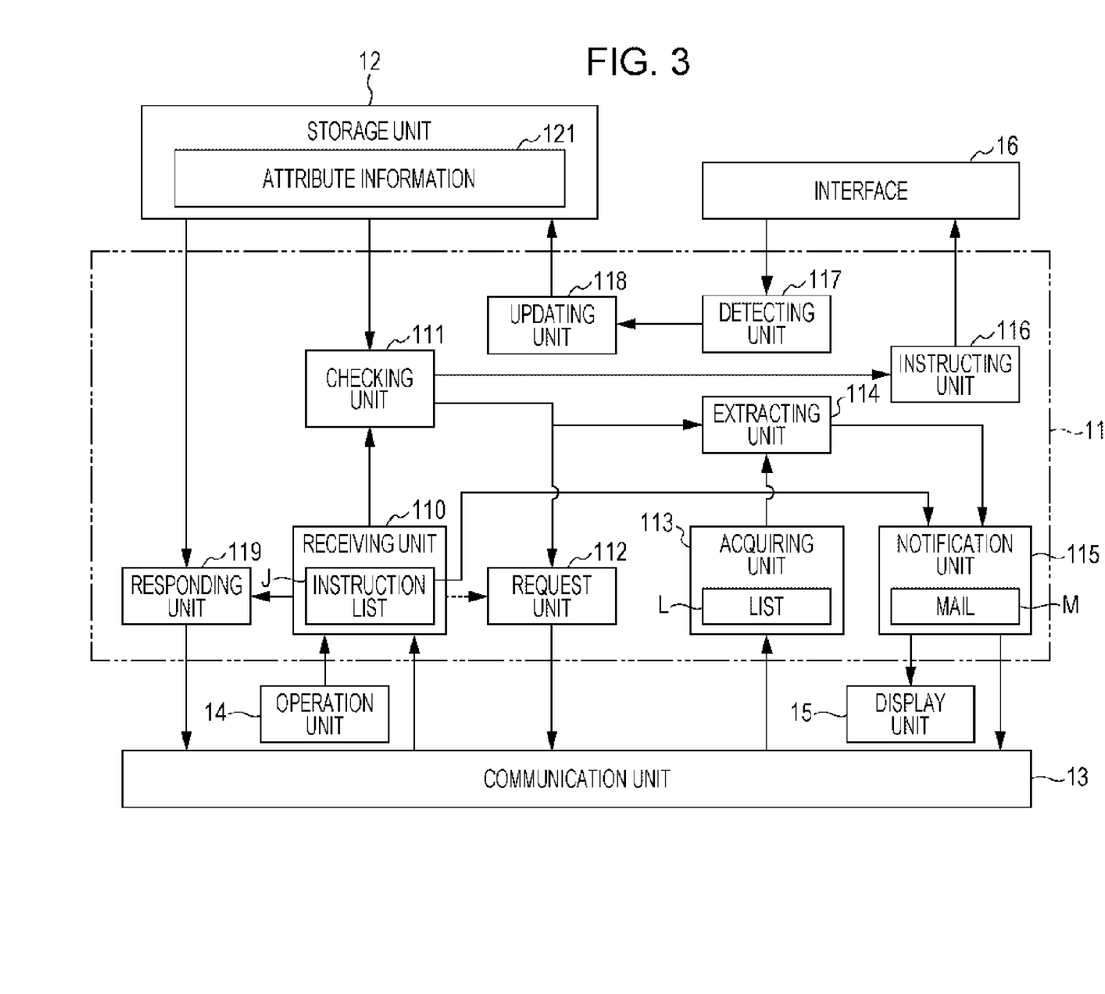
FIG. 3 is a diagram illustrating the functional configuration of the image processing apparatus according to the exemplary embodiment of the present invention.

FIG. 3 is a diagram illustrating the functional configuration of an image processing apparatus 1 according to the exemplary embodiment of the present invention. The controller 11 of the image processing apparatus 1 includes a receiving unit 110, a checking unit 111, a request unit 112, an acquiring unit 113, an extracting unit 114, a notification unit 115, an instructing unit 116, a detecting unit 117, an updating unit 118, and a responding unit 119.

The receiving unit 110 has the following four functions.

First, the receiving unit 110 receives an instruction to perform image processing, which is transmitted from the terminal 2 via the communication line 3 and the communication unit 13. In the exemplary embodiment, the receiving unit 110 receives an instruction to form images on a medium, as an instruction to perform image processing. The received instruction is accumulated as a member of an instruction list J on the RAM of the controller 11.

Second, the receiving unit 110 receives a request for the attribute information 121, which is transmitted from a second image processing apparatus 1 via the communication line 3 and the communication unit 13. When a request for the attribute information 121 is received, the receiving unit 110 transmits a notification of this to the responding unit 119.

Third, the receiving unit 110 receives an operation (hereinafter, referred to as a reception operation) performed on the operation unit 14 by a user who comes to get a medium on which images are formed.

Fourth, when the image processing apparatus 1 is described as a request receiver in a mail M transmitted from a second image processing apparatus 1 to the terminal 2, the receiving unit 110 receives the instruction corresponding to the instruction number described in the mail M, from the second image processing apparatus 1. The received instruction is accumulated in the above-described instruction list J.

Figure 4:
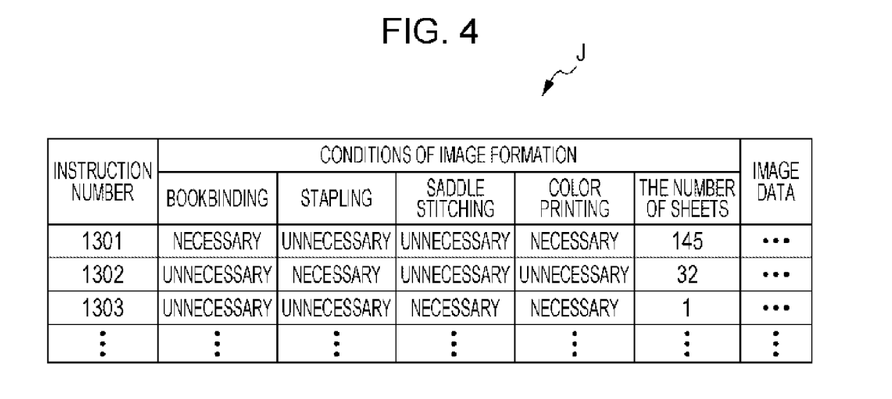
FIG. 4 is a diagram illustrating an exemplary instruction list.

FIG. 4 is a diagram illustrating an exemplary instruction list J. The instruction list J is a list in which instructions received from the terminal 2 and a second image processing apparatus 1 are accumulated. In the instruction list J, an instruction number for identifying an instruction and arranging instructions in order of reception time, conditions of image formation (image processing) described in the instruction, and image data which is to be subjected to image formation (image processing) according to the instruction are described. The instruction list J serves as a so-called queue, i.e., first in first out. Instruction numbers are allocated to instructions accumulated in the instruction list J, in order of reception time at the receiving unit 110.

The conditions of image formation include information about whether or not "bookbinding" processing in which, for example, sheets of medium on which images are formed are bound into a book is to be performed, information about whether or not "stapling" processing in which the sheets of medium are stapled by using a stapler is to be performed, information about whether or not "saddle stitching" processing in which each of the sheets of medium is folded into two so that the folded sheets of medium are overlaid with one another to form a book is to be performed, information about whether or not image formation is to be performed in color, and the number of sheets of medium on which images are to be formed.

When an instruction received from a second image processing apparatus 1 is accumulated in the instruction list J, the controller 11 may allocate a new instruction number to the instruction, and may store the original instruction number of the instruction and the identification information of the second image processing apparatus 1 that has transmitted the instruction on the RAM in such a manner that the original instruction number and the identification information are associated with each other.

The checking unit 111 has the following two functions.

First, in the case where instructions are accumulated in the instruction list J, the checking unit 111 reads out the instructions accumulated in the instruction list J, one by one in ascending order of the instruction number, and checks the image formation conditions described in the instruction against the attribute information 121 stored in the storage unit 12.

Second, when the receiving unit 110 receives a reception operation, the checking unit 111 checks the instruction indicated by the reception operation, against the instruction list J, and determines whether or not the image processing apparatus 1 has received the instruction from a second image processing apparatus 1. If the instruction list J does not include the above-described instruction, the checking unit 111 determines that the image processing apparatus 1 has not received the instruction from a second image processing apparatus 1. If the instruction list J includes the above-described instruction, the checking unit 111 determines that the image processing apparatus 1 has received the instruction.

Figure 5:
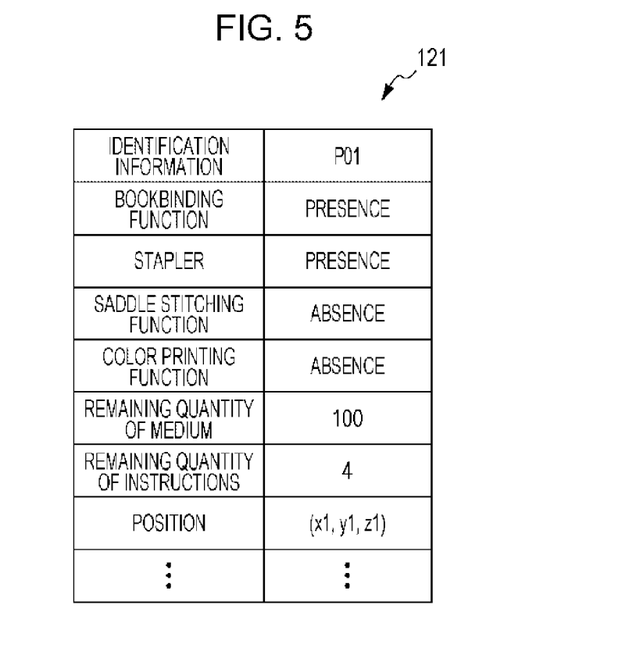
FIG. 5 is a diagram illustrating exemplary attribute information.

FIG. 5 is a diagram illustrating exemplary attribute information 121. The attribute information 121 includes identification information used to identify the image processing apparatus 1, and the presence or absence of each of various types of functions of the image processing apparatus 1. In the example in FIG. 5, the attribute information 121 describes that the identification information of the image processing apparatus 1 is "P01", that a bookbinding function and a stapler are provided for the image processing apparatus 1, and that a saddle stitching function and a color printing function are not provided for the image processing apparatus 1. The remaining quantity of medium represents the number of remaining sheets of medium, such as sheets of paper prepared for image formation, and is 100 in this example. The remaining quantity of instructions represents the number of remaining instructions which have not been processed, among the instructions which are received by the receiving unit 110 of the image processing apparatus 1 and which are accumulated in the instruction list J, and is four in this example. The position is a position at which the image processing apparatus 1 is installed, and is, for example, represented by using xyz space coordinates.

As long as the position information represents the position of the image processing apparatus 1, any information may be used as the position information. The position information may be identification information of a room in which the image processing apparatus 1 is installed. It is not necessary to use a spatial position as the position, and the position may be a position on the communication line 3. For example, when the image processing system 9 uses, for example, a network in which multiple grouped networks (hereinafter, referred to as network groups) are connected via nodes, as the communication line 3, the position information may represent the position on the network, that is, information indicating which network group is one to which the image processing apparatus 1 belongs.

The checking unit 111 determines whether or not an instruction which is read out from the instruction list J may be executed by using the capability of the image processing apparatus 1 which is described in the attribute information 121, on the basis of the check result obtained through the first function of the checking unit 111. For example, when an instruction which is read out from the instruction list J involves bookbinding processing as a condition of image formation, the controller 11 of an image processing apparatus 1 having the attribute information 121 describing that a bookbinding function is not provided serves as the checking unit 111, and determines that the image processing apparatus 1 is not capable of executing the above-described instruction. When the above-described instruction demands that images be formed on 150 sheets of medium, the controller 11 of the image processing apparatus 1 corresponding to the identification information "P01" illustrated in FIG. 5 serves as the checking unit 111, and determines that the image processing apparatus 1 is not capable of executing the above-described instruction because the remaining quantity of medium which is described in the attribute information 121 is 100 sheets which are less than 150 sheets.

If the capabilities of the image processing apparatus 1 satisfy all of the conditions of the image formation, the controller 11 of the image processing apparatus 1 serves as the checking unit 111, and determines that the image processing apparatus 1 is capable of executing the above-described instruction.

If the checking unit 111 determines that the image processing apparatus 1 is capable of executing the above-described instruction, the checking unit 111 causes the instructing unit 116 to operate. If the checking unit 111 determines that the image processing apparatus 1 is not capable of executing the above-described instruction, the checking unit 111 causes the request unit 112 to operate.

The instructing unit 116 instructs the image forming apparatus 4 illustrated in FIG. 2 to form images, via the interface 16 on the basis of the instruction determined by the checking unit 111 to be executable in the image processing apparatus 1. Thus, the image forming apparatus 4 forms images on a medium.

The request unit 112 has the following two functions.

First, the request unit 112 requests the attribute information 121 from second image processing apparatuses 1 via the communication unit 13 and the communication line 3 in order to find a second image processing apparatus 1 which may execute an instruction determined by the checking unit 111 to be inexecutable in the image processing apparatus 1.

Second, when the checking unit 111 determines that the image processing apparatus 1 has not received an instruction indicated by a reception operation received by the receiving unit 110, from a second image processing apparatus 1, the request unit 112 requests the attribute information 121 from second image processing apparatuses 1.

When the receiving unit 110 receives a request for the attribute information 121 from a second image processing apparatus 1, the responding unit 119 reads out the attribute information 121 from the storage unit 12 and transmits the attribute information 121 as a response to the request via the communication unit 13.

The acquiring unit 113 acquires the attribute information 121 transmitted as the response to a request which has been transmitted by the request unit 112 to a second image processing apparatus 1, and stores it in a list L. The list L is a list stored on the RAM of the controller 11.

Figure 6:
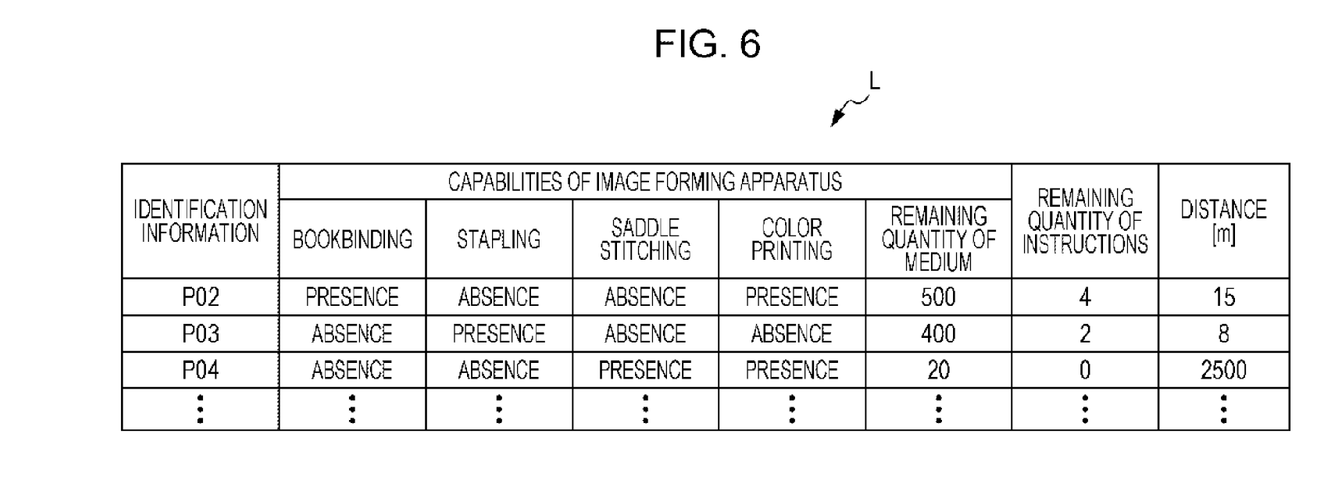
FIG. 6 is a diagram illustrating an exemplary list.

FIG. 6 is a diagram illustrating an exemplary list L. In the list L, pieces of the attribute information 121 requested by the image processing apparatus 1 (first image processing apparatus 1) corresponding to the identification information "P01" from second image processing apparatuses 1 are accumulated. For example, the list L illustrated in FIG. 6 describes that the second image processing apparatus 1 corresponding to identification information "P02" has a bookbinding function and a color function, but does not have a stapling function and a saddle stitching function. The remaining quantity of medium of the second image processing apparatus 1 corresponding to identification information "P02" is 500, and the remaining quantity of instructions is four. In the distance column, the distance between the second image processing apparatus 1 corresponding to an obtained piece of attribute information 121 and the first image processing apparatus 1 is filled in by calculating the distance on the basis of the position information described in the obtained piece of attribute information 121 and the position information described in the attribute information 121 of the first image processing apparatus 1. Specifically, when the position information is represented by using xyz space coordinates, the distance is, for example, the length of a line segment between the positions of the first and second image processing apparatuses 1, that is, the straight-line distance or the like.

When the position information is represented by using the above-described identification information of a room, the distance may be, for example, the distance between rooms in which the first and second image processing apparatuses 1 are installed. When the position information is represented by using the above-described position on a network, the distance may be represented, for example, by using the number of devices which serve as nodes provided between network groups to which the respective first and second image processing apparatuses 1 are connected.

The extracting unit 114 extracts the attribute information 121 of a second image processing apparatus 1 which is capable of executing an instruction determined by the checking unit 111 to be inexecutable in the first image processing apparatus 1, from the list L containing pieces of attribute information 121 of the second image processing apparatuses 1 which are obtained by the acquiring unit 113. If multiple pieces of attribute information 121 are extracted, the extracting unit 114 specifies, for example, a piece of attribute information 121 in which the remaining quantity of medium is the smallest, in which the remaining quantity of instructions is the smallest, or for which the distance between the first and second image processing apparatuses 1 is the shortest, among the extracted pieces of attribute information 121. When a piece for which the distance is the shortest is specified from the extracted pieces of attribute information 121, the extracting unit 114 serves as an exemplary extracting unit which specifies a piece of attribute information from multiple pieces of attribute information in accordance with the distance between the first image processing apparatus and each of the second image processing apparatuses which are capable of executing the instruction, by calculating the distance on the basis of the information representing the position of the first image processing apparatus and the information representing the position of each of the second image processing apparatuses.

The notification unit 115 has the following three functions.

First, when the checking unit 111 determines that the image processing apparatus 1 is not capable of executing an instruction which has been transmitted by the terminal 2, the notification unit 115 transmits a mail M according to the extraction result obtained by the extracting unit 114, to the terminal 2.

Second, when the notification unit 115 transmits the above-described mail M to the terminal 2, the notification unit 115 transmits the instruction corresponding to the instruction number described in the mail M, to the second image processing apparatus 1 described as a request receiver in the mail M. In this case, the controller 11 may delete the instruction which has been transmitted, from the instruction list J on the RAM after the transmission is completed.

Third, when the checking unit 111 determines that the image processing apparatus 1 has not received the instruction indicated by a reception operation, the notification unit 115 displays the extraction result obtained by the extracting unit 114 on the display unit 15, and notifies the user.

When the list L does not contain the attribute information 121 of a second image processing apparatus 1 which is capable of executing the above-described instruction, the extracting unit 114 extracts no attribute information 121. In this case, the notification unit 115 notifies the user that no second image processing apparatuses 1 which are capable of executing the instruction are found, by transmitting the mail M describing the message to the terminal 2 and by displaying the message on the display unit 15.

When the list L contains the attribute information 121 of a second image processing apparatus 1 which is capable of executing the above-described instruction, the extracting unit 114 extracts the attribute information 121. In this case, the notification unit 115 writes a message that a second image processing apparatus 1 which is capable of executing the instruction is found, and the identification information of the second image processing apparatus 1 into the mail M, and displays them on the display unit 15.

When the extracting unit 114 extracts multiple pieces of attribute information 121, the notification unit 115 writes a message that multiple second image processing apparatuses 1 which are capable of executing the instruction are found, and the identification information of the second image processing apparatus 1 storing one piece of attribute information 121 specified by the extracting unit 114 from the pieces of attribute information 121, into the mail M, and displays them on the display unit 15.

Figure 7:
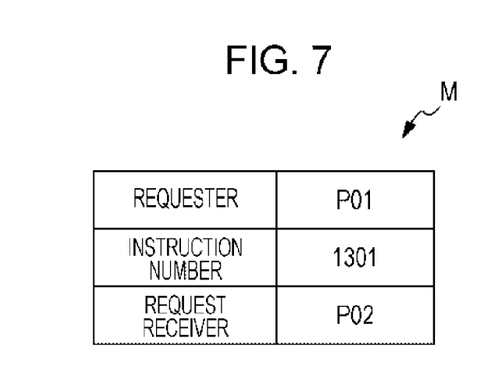
FIG. 7 is a diagram illustrating an exemplary mail generated when an image processing apparatus which is capable of executing an instruction is found.

FIG. 7 is a diagram illustrating an exemplary mail M generated when a second image processing apparatus 1 which is capable of executing an instruction is found. In the mail M, the identification information of the image processing apparatus 1 which is to transmit the mail M is written as a "requester"; the identification information of the second image processing apparatus 1 which is found is written as a "request receiver"; and the instruction number of the instruction which is executable in the second image processing apparatus 1 is written.

As long as the mail M contains the items illustrated in FIG. 7, any format may be used in the mail M. For example, the "requester" may be described as the mail address of the transmission source of the mail, or may be described in the main body of the mail. The image processing apparatus 1 may transmit a mail containing a message "The instruction No. 1301 received by P01 is executable in P02." as the mail M to the terminal 2.

When the receiving unit 110 receives an instruction to perform image processing, from the terminal 2, the detecting unit 117 transmits an inquiry to the interface 16 so as to detect the capability of the image forming apparatus 4 connected to the image processing apparatus 1.

When the detection result obtained by the detecting unit 117 indicates that the capability of the image forming apparatus 4 connected to the interface 16 is changed, the updating unit 118 updates the attribute information 121 stored in the storage unit 12 in accordance with the change.

1-2. Operations

Figure 8:
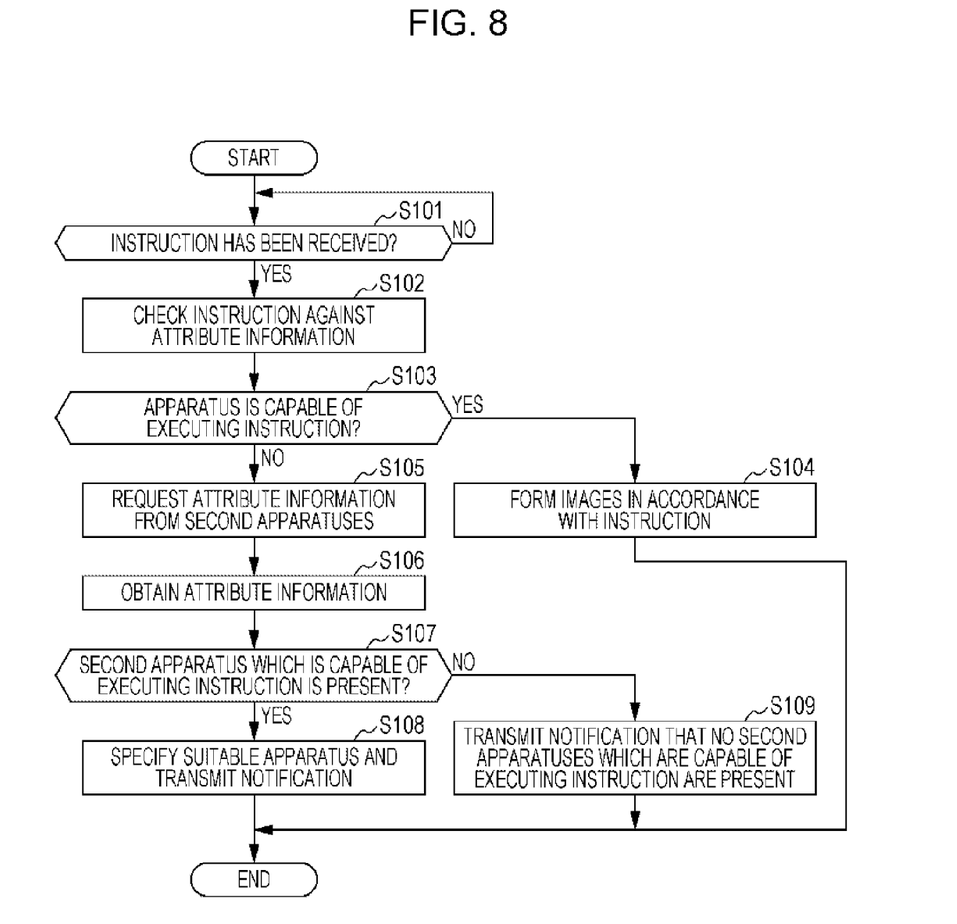
FIG. 8 is a flowchart of operations performed when the image processing apparatus according to the exemplary embodiment of the present invention receives an instruction to form images, from a terminal.

FIG. 8 is a flowchart of operations performed when the image processing apparatus 1 according to the exemplary embodiment of the present invention receives an instruction to form images, from the terminal 2. The controller 11 of the image processing apparatus 1 monitors the instruction list J on the RAM and determines whether or not an instruction has been received from the terminal 2 (in step S101). If it is determined that no instructions have been received (NO in step S101), this determination is repeatedly performed. If it is determined that an instruction has been received from the terminal 2 (YES in step S101), the controller 11 checks the conditions of image formation which are described in the instruction, against the attribute information 121 stored in the storage unit 12 (in step S102), and determines whether or not the image processing apparatus 1 is capable of executing the instruction (in step S103).

If it is determined that the image processing apparatus 1 is capable of executing the instruction (YES in step S103), the controller 11 controls the image forming apparatus 4 via the interface 16, forms images in accordance with the above-described instruction (in step S104), and ends the process. If it is determined that the image processing apparatus 1 is not capable of executing the instruction (NO in step S103), the controller 11 requests the attribute information 121 from second image processing apparatuses 1 via the communication unit 13 and the communication line 3 (in step S105).

When the controller 11 obtains the attribute information 121 as a response of the request (in step S106), the controller 11 determines whether or not a second image processing apparatus 1 which is capable of executing the above-described instruction is present, on the basis of the obtained attribute information 121 (in step S107). If it is determined that second image processing apparatuses 1 which are capable of executing the instruction are present (YES in step S107), the controller 11 specifies a suitable apparatus from the second image processing apparatuses 1 which are capable of executing the instruction, and notifies the terminal 2 of the identification information (in step S108). If it is determined that no second image processing apparatuses 1 which are capable of executing the instruction are present (NO in step S107), the controller 11 notifies the terminal 2 that no second image processing apparatuses 1 which are capable of executing the instruction are present (in step S109).

Figure 9:
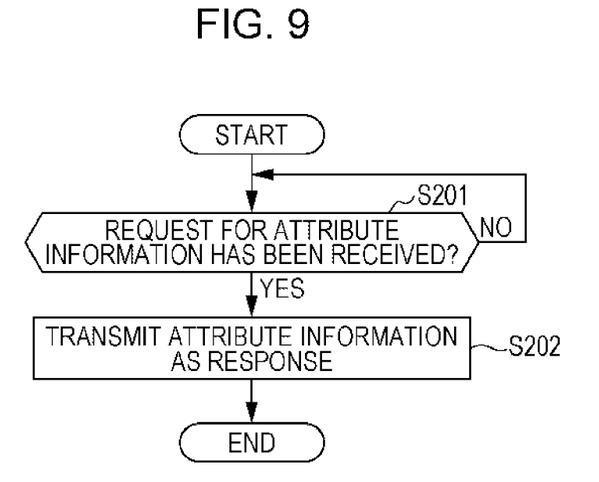
FIG. 9 is a flowchart of operations performed when the image processing apparatus according to the exemplary embodiment of the present invention receives a request for attribute information from a second image processing apparatus.

FIG. 9 is a flowchart of operations performed when the image processing apparatus 1 according to the exemplary embodiment of the present invention receives a request for the attribute information 121 from a second image processing apparatus 1. The controller 11 of the image processing apparatus 1 determines whether or not a request for the attribute information 121 has been received from a second image processing apparatus 1 (in step S201). While it is determined that a request has not been received (NO in step S201), the controller 11 continuously performs the determination. If it is determined that a request for the attribute information 121 has been received from a second image processing apparatus 1 (YES in step S201), the controller 11 reads out the attribute information 121 from the storage unit 12, and transmits the attribute information 121 to the second image processing apparatus 1 which has transmitted the request as described above, thereby responding to the request (in step S202).

Figure 10:
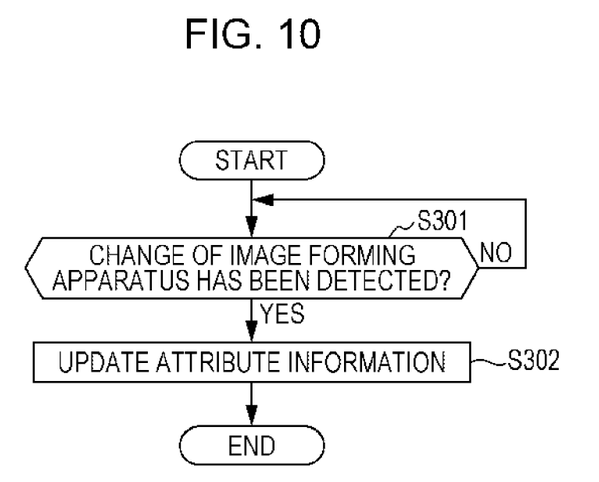
FIG. 10 is a flowchart of operations performed when the image processing apparatus according to the exemplary embodiment of the present invention detects a change of an image forming apparatus connected to the image processing apparatus.

FIG. 10 is a flowchart of operations performed when the image processing apparatus 1 according to the exemplary embodiment of the present invention detects a change of the image forming apparatus 4 connected to the image processing apparatus 1. The controller 11 of the image processing apparatus 1 monitors the image forming apparatus 4 connected via the interface 16, and determines whether or not a change of the image forming apparatus 4 has been detected (in step S301). While it is determined that no changes of the image forming apparatus 4 have been detected (NO in step S301), the controller 11 continuously performs the determination.

If it is determined that a change of the image forming apparatus 4 has been detected (YES in step S301), the controller 11 updates the attribute information 121 stored in the storage unit 12 in accordance with the detected change (in step S302).

For example, in the case where the image forming apparatus 4 is detached from the interface 16 of the image processing apparatus 1 due to maintenance or the like, when the detecting unit 117 transmits an inquiry to the interface 16, the detecting unit 117 detects the state in which the image forming apparatus 4 is not connected. When a configuration of the image forming apparatus 4 which is called a so-called finisher, such as a configuration for achieving a bookbinding function or a configuration for achieving a saddle stitching function, is detached due to maintenance or the like, the detecting unit 117 detects the state in which the capability of the detached finisher in the image forming apparatus 4 is lost. After a finisher which was not attached is attached to the image forming apparatus 4, when the detecting unit 117 transmits an inquiry to the interface 16, the detecting unit 117 detects the state in which the capability of the finisher is added to the image forming apparatus 4.

Figure 11:
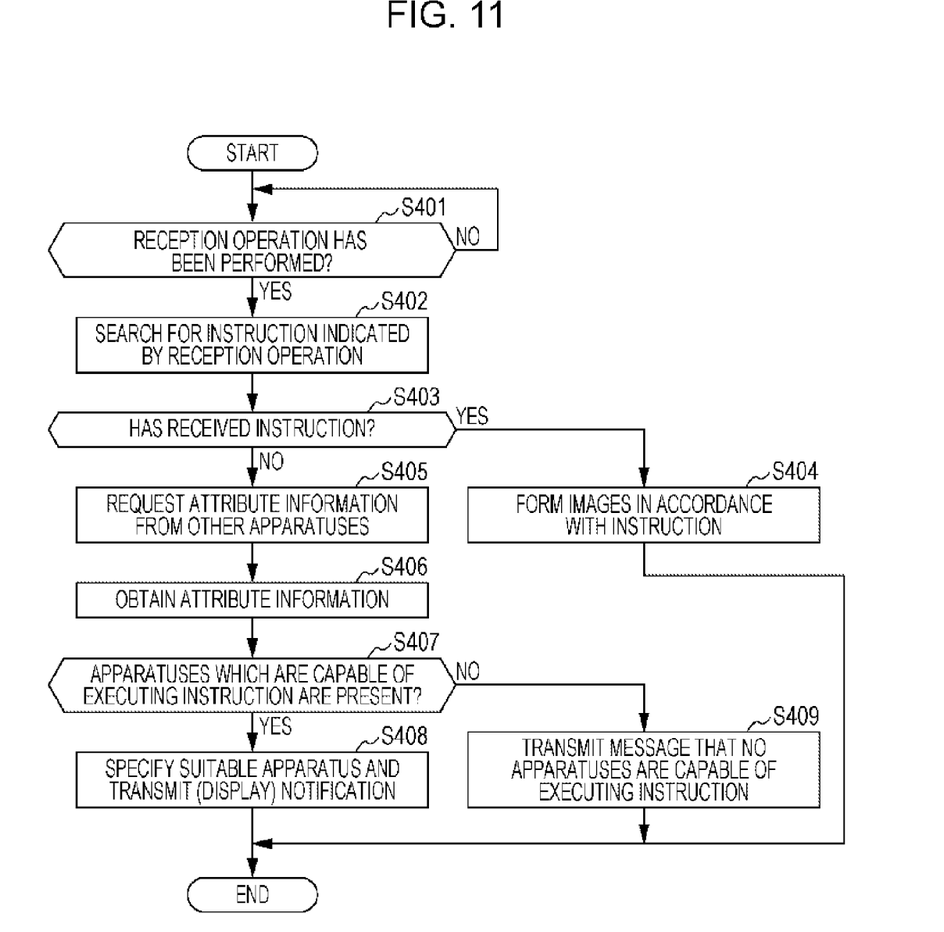
FIG. 11 is a flowchart of operations performed when the image processing apparatus according to the exemplary embodiment of the present invention receives an operation performed by a user who comes to get a medium on which image are formed.

FIG. 11 is a flowchart of operations performed when the image processing apparatus 1 according to the exemplary embodiment of the present invention receives an operation performed by a user who comes to get a medium on which images are formed. The user performs a reception operation for receiving a medium on which images are formed, on the operation unit 14. The reception operation is an operation in which the instruction number of an instruction which has been transmitted from the terminal 2 by the user, and the image processing apparatus 1 which has received the instruction are specified, whereby the image processing apparatus 1 is instructed to perform the instruction. The user receives the medium on which images are formed in accordance with the instruction.

The controller 11 of the image processing apparatus 1 monitors the operation unit 14, and determines whether or not a reception operation has been performed by a user on the operation unit 14 (in step S401). While it is determined that a reception operation has not been performed (NO in step S401), the controller 11 continuously performs the determination. If it is determined that a reception operation has been performed (YES in step S401), the controller 11 searches the instruction list J for an instruction indicated by the reception operation (in step S402). The controller 11 determines whether or not the instruction list J contains the instruction, that is, whether or not the image processing apparatus 1 has already received the instruction (in step S403).

For example, as described above, in the case where the first image processing apparatus 1 corresponding to the identification information "P01" has transmitted a mail containing a message "the instruction No. 1301 received by P01 is executable in P02", as the mail M to the terminal 2, and where the user is to perform a reception operation in accordance with the notification in the mail M, the user goes to the second image processing apparatus 1 corresponding to the identification information "P02" which is a request receiver in the notification, and performs a reception operation on the operation unit 14 of the second image processing apparatus 1. The user specifies the identification information "P01" of the first image processing apparatus 1 which is a requester and the instruction number "1301" in the reception operation. In this case, the controller 11 of the second image processing apparatus 1 corresponding to the identification information "P02" searches the instruction list J on the basis of the information specified in the reception operation, and determines that the second image processing apparatus 1 has already received the instruction to which the first image processing apparatus 1 corresponding to the identification information "P01" that is a requester has assigned the instruction number "1301" and which has been received by the first image processing apparatus 1.

If it is determined that the second image processing apparatus 1 has already received the instruction indicated by the reception operation (YES in step S403), the controller 11 controls the image forming apparatus 4 via the interface 16, forms images in accordance with the above-described instruction (in step S404), and ends the process. If it is determined that the second image processing apparatus 1 has not yet received the instruction indicated by the reception operation (NO in step S403), the controller 11 requests the attribute information 121 from third image processing apparatuses 1 via the communication unit 13 and the communication line 3 (in step S405).

When the controller 11 obtains the attribute information 121 as a response to the request (in step S406), the controller 11 determines whether or not third image processing apparatuses 1 which are capable of executing the above-described instruction are present, on the basis of the obtained attribute information 121 (in step S407). If it is determined that third image processing apparatuses 1 which are capable of executing the instruction are present (YES in step S407), the controller 11 specifies a suitable apparatus from the third image processing apparatuses 1 which are capable of executing the instruction, and displays the identification information of the specified apparatus on the display unit 15, thereby notifying the user (in step S408). If it is determined that no third image processing apparatuses 1 which are capable of executing the instruction are present (NO in step S407), the controller 11 displays a message that no image processing apparatuses 1 are capable of executing the instruction, on the display unit 15, thereby notifying the user (in step S409).

As described above, the described operations cause each of the controllers 11 of multiple image processing apparatuses 1 to serve as the request unit 112, the acquiring unit 113, and the responding unit 119. Thus, a so-called peer-to-peer network is configured, and the instruction list J accumulated in each of the image processing apparatuses 1 and the attribute information 121 of each of the image processing apparatuses 1 are shared among the image processing apparatuses 1. Therefore, the image processing system 9 according to the exemplary embodiment of the present invention notifies a user of an image processing apparatus which is capable of performing requested image processing, without a server which manages the image processing apparatuses 1. That is, the image processing system 9 according to the exemplary embodiment of the present invention does not need a server which manages the image processing apparatuses 1, resulting in a reduction in cost compared with a configuration having a server.

2. Modified Exemplary Embodiments

As described above, the exemplary embodiment is described. The exemplary embodiment may be changed as described below. The modified exemplary embodiments described below may be combined with one another.

2-1. First Modified Exemplary Embodiment

In the above-described exemplary embodiment, the interface 16 is connected to the image forming apparatus 4 which forms images, and transmits an instruction from the image processing apparatus 1 to the image forming apparatus 4. Instead of being connected to the image forming apparatus 4, the interface 16 may be connected to an apparatus which performs other image processing, such as a projector or broadcast equipment.

2-2. Second Modified Exemplary Embodiment

In the above-described exemplary embodiment, the request unit 112 requests the attribute information 121 from second image processing apparatuses 1. Alternatively, the request destinations may be limited. For example, the request unit 112 may request the attribute information 121 from second image processing apparatuses 1 which belong to the same network group as the image processing apparatus 1.

The request unit 112 may limit the second image processing apparatuses 1 which are request destinations, by using the distance on the communication line 3 between each of the second image processing apparatuses 1 and the image processing apparatus 1. For example, the request unit 112 may request the attribute information 121 from each of the second image processing apparatuses 1 which is present in an area in which at most two relay apparatuses such as routers are present on a communication line between the second image processing apparatus 1 and the image processing apparatus 1.

2-3. Third Modified Exemplary Embodiment

In the above-described exemplary embodiment, when the controller 11 determines that the image processing apparatus 1 is capable of executing an instruction in step S103, the controller 11 controls the image forming apparatus 4 via the interface 16, performs image formation in accordance with the instruction, and ends the process. Alternatively, until a reception operation performed by a user is received, the controller 11 may wait without performing image formation. In this case, the image processing apparatus 1 may notify the terminal 2 that the image processing apparatus 1 is capable of executing the instruction.

2-4. Fourth Modified Exemplary Embodiment

In the above-described exemplary embodiment, when the receiving unit 110 receives an instruction from the terminal 2, the detecting unit 117 transmits an inquiry to the interface 16 so as to detect the capability of the image forming apparatus 4 connected to the image processing apparatus 1. The timing at which the capability of the image forming apparatus 4 is detected is not limited to this. For example, the detecting unit 117 may transmit an inquiry to the interface 16 at a predetermined time or at predetermined time intervals so as to detect the capability of the image forming apparatus 4 connected to the image processing apparatus 1.

2-5. Fifth Modified Exemplary Embodiment

In the above-described exemplary embodiment, when the notification unit 115 performs transmission of the mail M to the terminal 2, which is described as the second function of the notification unit 115, an instruction whose instruction number is described in the mail M is transmitted to the second image processing apparatus 1 which is described as a request receiver in the mail M. The identification information of the requester described in the mail M and the instruction number may be transmitted to the second image processing apparatus 1 described as a request receiver in the mail M. In this case, the controller 11 of the second image processing apparatus 1 which receives the identification information of the requester and the instruction number accumulates the instruction indicated by the instruction number as a preliminary instruction received by the second image processing apparatus 1, in the instruction list J. The controller 11 associates the accumulated preliminary instruction with the identification information of the image processing apparatus 1 which is a requester and which has received the instruction corresponding to the preliminary instruction, so as to store the preliminary instruction and the identification information in the storage unit 12.

When a reception operation specifying the preliminary instruction is received, the controller 11 transmits an inquiry to the image processing apparatus 1 corresponding to the identification information of the above-described requester, via the communication unit 13, so as to request image data which is the target of image processing according to the preliminary instruction. When the requested image data is obtained from the image processing apparatus 1 which is a requester, the controller 11 may control the image forming apparatus 4 on the basis of the obtained image data so that images are formed on a medium. Thus, until a user comes to get the medium according to the information in the mail M, the image processing apparatus 1 does not transfer the image data, reducing communication load compared with a case in which the entire instruction including image data is transferred at the same time of transmission of the mail M.

2-6. Sixth Modified Exemplary Embodiment

In the above-described exemplary embodiment, to find a second image processing apparatus 1 which is capable of executing an instruction determined by the checking unit 111 to be inexecutable in the image processing apparatus 1 or an instruction determined to be an instruction which has not been received by the image processing apparatus 1, the request unit 112 requests the attribute information 121 from second image processing apparatuses 1 connected to the communication line 3. Alternatively, the request unit 112 may transmit, as a request, the conditions of image processing in the above-described instruction to second image processing apparatuses 1, and each of the second image processing apparatuses 1 may determine whether or not the second image processing apparatus 1 has the attribute information 121 which satisfies the conditions. When the attribute information 121 satisfies the conditions, the second image processing apparatus 1 may transmit the attribute information 121 as a response to the request.

In this case, the responding unit 119 specifies the conditions of image processing in the above-described instruction, from the request for the attribute information 121 which is received from a second image processing apparatus 1, checks the conditions against the attribute information 121 stored in the storage unit 12 of the image processing apparatus 1, and determines whether or not the attribute information 121 satisfies the specified conditions. When the responding unit 119 determines that the attribute information 121 of the image processing apparatus 1 satisfies the above-described conditions, the responding unit 119 may transmit the attribute information 121.

2-7. Seventh Modified Exemplary Embodiment

In the above-described exemplary embodiment, the attribute information 121 is changed in accordance with the condition of the image forming apparatus 4 connected to the interface 16. For example, when the image forming apparatus 4 is connected in such a manner as to be prevented from being detached from the interface 16, the attribute information 121 may remain as it was stored in the storage unit 12. In this case, the configuration of the image forming apparatus 4 is unlikely to be changed. Therefore, the detecting unit 117 and the updating unit 118 may be omitted.

2-8. Eighth Modified Exemplary Embodiment

In the above-described exemplary embodiment, when the extracting unit 114 extracts multiple pieces of attribute information 121, the notification unit 115 writes a message that multiple second image processing apparatuses 1 which are capable of executing the instruction are found, in the mail M, and also writes the identification information of the second image processing apparatus 1 storing a piece of attribute information 121 specified by the extracting unit 114 from the multiple pieces of attribute information 121, in the mail M. The notification unit 115 also displays the message and the identification information on the display unit 15 so as to notify the user. Alternatively, the notification unit 115 may notify the user of the identification information of each of the second image processing apparatuses 1 which stores a corresponding one of the multiple extracted pieces of attribute information 121.

The notification unit 115 may notify the user or the terminal 2 of the above-described information described in the mail M and the information displayed on the display unit 15 by using other methods instead of using a mail or a display.

2-9. Ninth Modified Exemplary Embodiment

In the above-described exemplary embodiment, the terminal 2 is a personal computer or the like, using which a user transmits an instruction to perform image processing to an image processing apparatus 1. The terminal 2 may be a cellular phone, a personal digital assistant (PDA), a portable music playback device, a portable movie playback device, a game console, an electronic book reader, a navigation device, or the like.

2-10. Tenth Modified Exemplary Embodiment

Programs executed by the controller 11 may be provided by storing them in a computer-readable recording medium, such as a magnetic recording medium, e.g., a magnetic tape or a magnetic disk, an optical recording medium, e.g., an optical disk, a magneto-optical recording medium, or a semiconductor memory. The programs may be downloaded via a network such as the Internet. Various types of devices other than a CPU may be used as a controller exemplified by the above-described controller 11. For example, a dedicated processor or the like is used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
  a storage configured to store attribute information describing an attribute of the image processing apparatus; and
  at least one processor configured to implement:
    a receiving unit configured to receive an instruction to perform image processing, from a terminal;
    a checking unit configured to check a condition of the image processing of the instruction received by the receiving unit against the attribute information stored in the storage, and that determines whether or not the image processing apparatus is capable of executing the instruction;
    a request unit configured to request attribute information from a second image processing apparatus when the checking unit determines that the image processing apparatus is not capable of executing the instruction;
    an acquiring unit configured to acquire one or more pieces of attribute information transmitted as a response to the request;
    an extracting unit configured to extract attribute information of a second image processing apparatus which is capable of executing the instruction, from the one or more pieces of attribute information acquired by the acquiring unit; and
    a notification unit configured to notify the terminal of identification information of the second image processing apparatus storing the attribute information extracted by the extracting unit, the terminal having transmitted the instruction.

2. The image processing apparatus according to claim 1, wherein the at least one processor is further configured to implement:
  a responding unit configured to, when the request for attribute information is received from a second image processing apparatus, transmit the attribute information stored in the storage so as to respond to the request.

3. The image processing apparatus according to claim 2, wherein the at least one processor is further configured to implement:
  a detecting unit configured to detect a capability of an image forming apparatus connected to the image processing apparatus, as an attribute of the image processing apparatus; and
  an updating unit configured to update the attribute information stored in the storage when the detection result obtained by the detecting unit indicates that the capability of the image forming apparatus connected to the image processing apparatus has been changed.

4. The image processing apparatus according to claim 3, wherein, when the extracting unit extracts a plurality of pieces of attribute information of second image processing apparatuses which are capable of executing the instruction, the extracting unit is further configured to specify one piece of attribute information from the plurality of pieces of attribute information, and
wherein, when the extracting unit specifies the one piece of attribute information from the plurality of pieces of attribute information, the notification unit is further configured to notify the terminal of identification information of the second image processing apparatus storing the specified attribute information.

5. The image processing apparatus according to claim 4, wherein the attribute information includes information representing a position of the image processing apparatus, and
wherein, when the extracting unit extracts the plurality of pieces of attribute information of the second image processing apparatuses which are capable of executing the instruction, the extracting unit is further configured to specify the one piece of attribute information in accordance with a distance between each of the second image processing apparatuses and the image processing apparatus, the distance being calculated on a basis of information representing the position of each of the second image processing apparatuses and information representing the position of the image processing apparatus.

6. The image processing apparatus according to claim 2, wherein, when the extracting unit extracts a plurality of pieces of attribute information of second image processing apparatuses which are capable of executing the instruction, the extracting unit is further configured to specify one piece of attribute information from the plurality of pieces of attribute information, and wherein, when the extracting unit specifies the one piece of attribute information from the plurality of pieces of attribute information, the notification unit is further configured to notify the terminal of identification information of the second image processing apparatus storing the specified attribute information.

7. The image processing apparatus according to claim 6, wherein the attribute information includes information representing a position of the image processing apparatus, and wherein, when the extracting unit extracts the plurality of pieces of attribute information of the second image processing apparatuses which are capable of executing the instruction, the extracting unit is further configured to specify the one piece of attribute information in accordance with a distance between each of the second image processing apparatuses and the image processing apparatus, the distance being calculated on a basis of information representing the position of each of the second image processing apparatuses and information representing the position of the image processing apparatus.

8. The image processing apparatus according to claim 1, wherein the at least one processor is further configured to implement:
  a detecting unit configured to detect a capability of an image forming apparatus connected to the image processing apparatus, as an attribute of the image processing apparatus; and
  an updating unit configured to update the attribute information stored in the storage when the detection result obtained by the detecting unit indicates that the capability of the image forming apparatus connected to the image processing apparatus has been changed.

9. The image processing apparatus according to claim 8, wherein, when the extracting unit extracts a plurality of pieces of attribute information of second image processing apparatuses which are capable of executing the instruction, the extracting unit is further configured to specify one piece of attribute information from the plurality of pieces of attribute information, and wherein, when the extracting unit specifies the one piece of attribute information from the plurality of pieces of attribute information, the notification unit is further configured to notify the terminal of identification information of the second image processing apparatus storing the specified attribute information.

10. The image processing apparatus according to claim 9, wherein the attribute information includes information representing a position of the image processing apparatus, and wherein, when the extracting unit extracts the plurality of pieces of attribute information of the second image processing apparatuses which are capable of executing the instruction, the extracting unit is further configured to specify the one piece of attribute information in accordance with a distance between each of the second image processing apparatuses and the image processing apparatus, the distance being calculated on a basis of information representing the position of each of the second image processing apparatuses and information representing the position of the image processing apparatus.

11. The image processing apparatus according to claim 1, wherein, when the extracting unit extracts a plurality of pieces of attribute information of second image processing apparatuses which are capable of executing the instruction, the extracting unit is further configured to specify one piece of attribute information from the plurality of pieces of attribute information, and wherein, when the extracting unit specifies the one piece of attribute information from the plurality of pieces of attribute information, the notification unit is further configured to notify the terminal of identification information of the second image processing apparatus storing the specified attribute information.

12. The image processing apparatus according to claim 11, wherein the attribute information includes information representing a position of the image processing apparatus, and wherein, when the extracting unit extracts the plurality of pieces of attribute information of the second image processing apparatuses which are capable of executing the instruction, the extracting unit is further configured to specify the one piece of attribute information in accordance with a distance between each of the second image processing apparatuses and the image processing apparatus, the distance being calculated on a basis of information representing the position of each of the second image processing apparatuses and information representing the position of the image processing apparatus.

13. An image processing system comprising:
an image processing apparatus comprising:
  a storage configured to store attribute information describing an attribute of the image processing apparatus; and
  at least one processor configured to implement:
    a receiving unit configured to receive an instruction to perform image processing, from a terminal;
    a checking unit configured to check a condition of the image processing of the instruction received by the receiving unit against the attribute information stored in the storage, and that determines whether or not the image processing apparatus is capable of executing the instruction;
    a request unit configured to request attribute information from a second image processing apparatus when the checking unit determines that the image processing apparatus is not capable of executing the instruction;
    an acquiring unit configured to acquire one or more pieces of attribute information transmitted as a response to the request;
    an extracting unit configured to extract attribute information of a second image processing apparatus which is capable of executing the instruction, from the one or more pieces of attribute information acquired by the acquiring unit; and
    a notification unit configured to notify the terminal of identification information of the second image processing apparatus storing the attribute information extracted by the extracting unit, the terminal having transmitted the instruction;

a terminal configured to instruct the image processing apparatus to perform image processing; and a communication line configured to relay communication between the image processing apparatus and the terminal.

14. A non-transitory computer readable medium storing a program causing a computer to execute a process, the computer being provided for an image processing apparatus and having a storage storing attribute information describing an attribute of the image processing apparatus, the process comprising:

receiving an instruction to perform image processing, from a terminal;

checking a condition of the image processing of the received instruction against the attribute information stored in the storage, and determining whether or not the image processing apparatus is capable of executing the instruction;

requesting attribute information from a second image processing apparatus when it is determined that the image processing apparatus is not capable of executing the instruction;

acquiring one or more pieces of attribute information transmitted as a response to the request;

extracting attribute information of a second image processing apparatus which is capable of executing the instruction, from the one or more acquired pieces of attribute information; and notifying the terminal of identification information of the second image processing apparatus storing the extracted attribute information, the terminal having transmitted the instruction.

* * * * *